US007146875B2

(12) United States Patent
Gordy et al.

(10) Patent No.: US 7,146,875 B2
(45) Date of Patent: Dec. 12, 2006

(54) LOCKING DEVICE FOR CABLE ASSEMBLY

(75) Inventors: Donald G. Gordy, Moberly, MO (US); Gregory P. Ruhlander, Hannibal, MO (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 451 days.

(21) Appl. No.: 10/624,464

(22) Filed: Jul. 22, 2003

(65) Prior Publication Data

US 2004/0129105 A1 Jul. 8, 2004

Related U.S. Application Data

(60) Provisional application No. 60/438,730, filed on Jan. 8, 2003.

(51) Int. Cl.
*F16C 1/10* (2006.01)
*F16B 9/00* (2006.01)

(52) U.S. Cl. ............... 74/502.4; 74/502.6; 74/500.5; 403/195; 403/197

(58) Field of Classification Search ........... 74/502.4, 74/502.6, 500.5; 403/316, 195, 197; 439/545; 585/415

See application file for complete search history.

(56) References Cited

U.S. PATENT DOCUMENTS

| | | | |
|---|---|---|---|
| 3,205,727 A * | 9/1965 | Sevrence ............ 74/500.5 |
| 3,572,159 A | 3/1971 | Tschanz | |
| 4,177,691 A | 12/1979 | Fillmore | |
| 4,333,361 A | 6/1982 | Spease | |
| 4,406,177 A | 9/1983 | Bennett | |
| 4,418,583 A | 12/1983 | Taig | |
| 4,899,006 A * | 2/1990 | Dave et al. ............ 585/415 |
| 4,951,524 A | 8/1990 | Niskanen | |
| 5,161,428 A | 11/1992 | Petruccello | |
| 5,178,034 A | 1/1993 | Reasoner | |
| 5,584,212 A | 12/1996 | Wild | |
| 5,598,743 A * | 2/1997 | Yasuda ............ 74/502.4 |
| 5,632,182 A * | 5/1997 | Reasoner ............ 74/502.4 |
| 5,682,797 A | 11/1997 | Kelley | |

(Continued)

FOREIGN PATENT DOCUMENTS

| EP | 0 810 379 A2 * | 12/1997 |
|---|---|---|
| GB | 2 275 316 A * | 8/1994 |

OTHER PUBLICATIONS

US 5,687,797, 11/1997, Kelley (withdrawn)

*Primary Examiner*—Vinh T. Luong
(74) *Attorney, Agent, or Firm*—Richard M. Mescher; Porter Wright Morris & Arthur; Dean B. Watson

(57) ABSTRACT

A cable assembly includes an adjuster body having a plurality of teeth, a slider movable along the adjuster body, and a lock body having a plurality of teeth. The lock body is movable between a disengaged position allowing movement of the slider along the adjuster body and an engaged position preventing movement of the slider along the adjuster body. A mounting bracket receives the slider and has edges located in opposed lateral slots of the lock body. The lock body has a first section on one side of the mounting bracket which interlocks with the slider and a second section on the other side of the mounting bracket which forms the plurality of teeth. The interlock includes tabs of the first section extending into pockets of the slider. The lock body has a snap lock at one end opposed to the mounting bracket and engagable with the slider.

42 Claims, 9 Drawing Sheets

U.S. PATENT DOCUMENTS

| | | |
|---|---|---|
| 5,823,063 A | 10/1998 | Nagle |
| 6,171,141 B1 * | 1/2001 | Yasui et al. ................. 439/545 |
| 6,340,265 B1 * | 1/2002 | Suzuki et al. ............... 403/316 |
| 6,490,947 B1 * | 12/2002 | Burger ...................... 74/502.4 |
| 6,634,252 B1 * | 10/2003 | Mayville et al. ........... 74/502.6 |
| 7,029,194 B1 * | 4/2006 | Ishikawa et al. ............ 403/195 |
| 2002/0053253 A1 | 5/2002 | Burger |
| 2006/0053942 A1 * | 3/2006 | Ruhlander et al. ......... 74/502.4 |

* cited by examiner

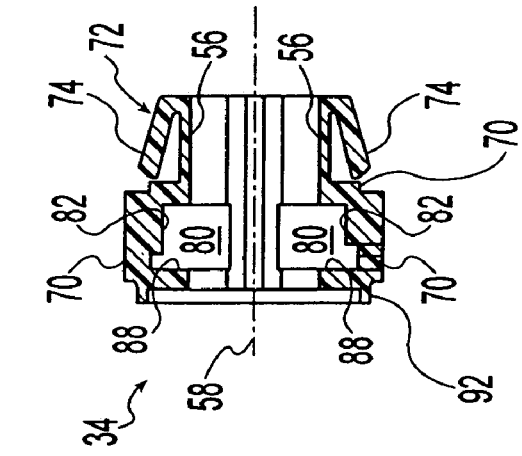
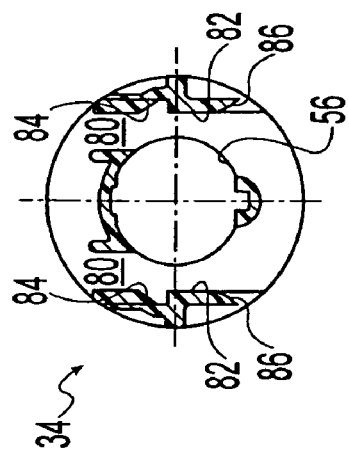
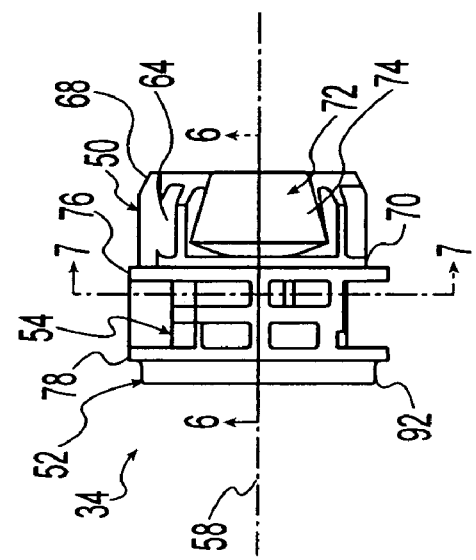
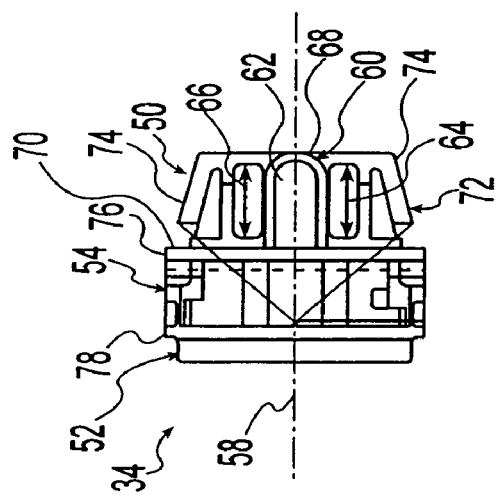

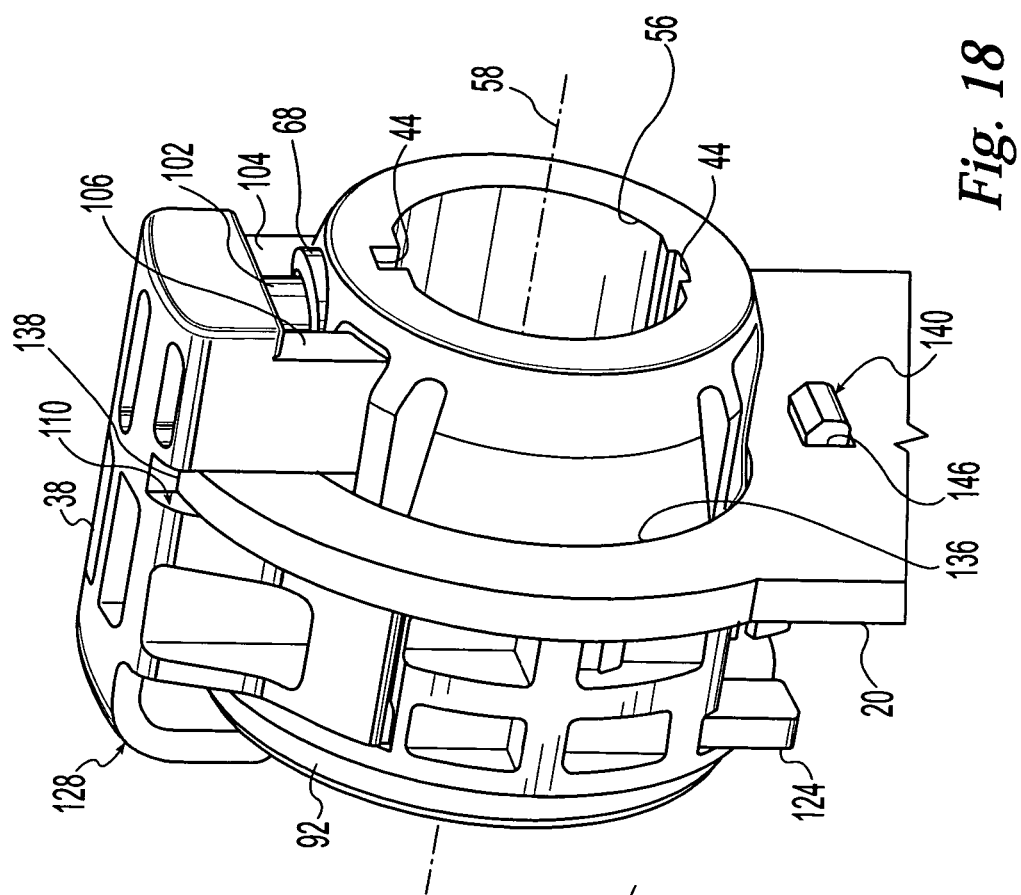
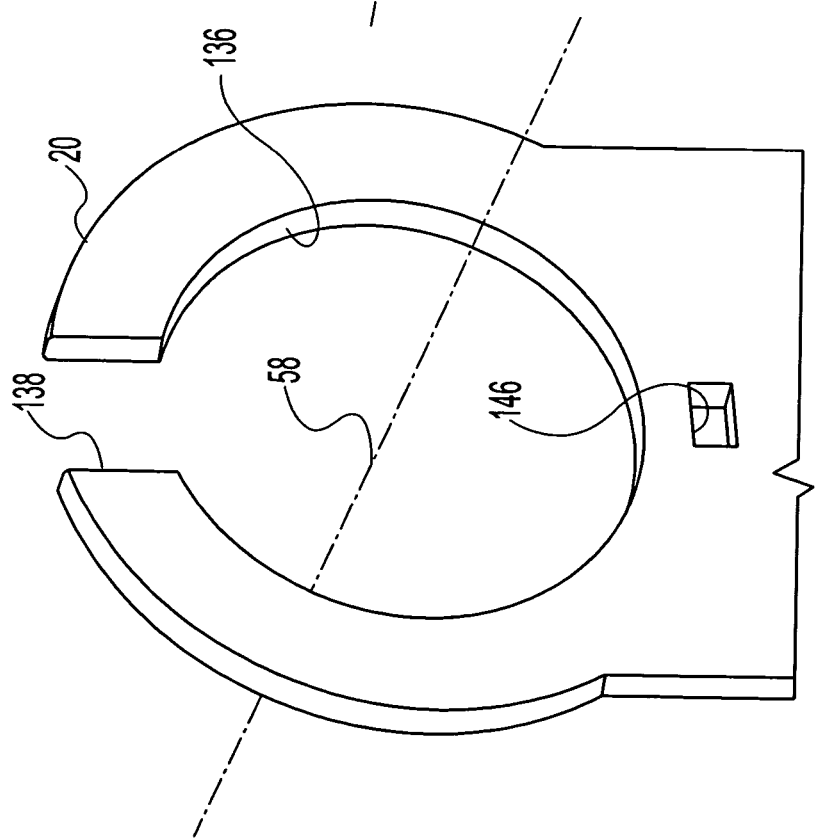
Fig. 18
Fig. 17

LOCKING DEVICE FOR CABLE ASSEMBLY

CROSS-REFERENCE TO RELATED APPLICATIONS

This application claims the benefit of U.S. Provisional Patent Application No. 60/438,730 filed Jan. 8, 2003, the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a motion-transmitting remote control cable assembly and, more particularly, to means for adjusting the length of such a cable assembly.

BACKGROUND OF THE INVENTION

Motion-transmitting remote control cable assemblies, sometimes referred to as "Bowden cables" or "push-pull cables," are used for transmitting both force and travel along a curved path in aircraft, automotive, and marine environments. Known cable assemblies can be used for transmitting load and motion in both push and pull type applications. In the automotive environment, typical applications include but are not limited to parking brakes, accelerators, hood releases, brake releases, trunk releases, park lock, tilt wheel controls, fuel filler doors, transmission shifter cables, and hydraulic control cables. One specific use of such remote control cable assemblies is positioning transmission shift members in automobiles.

A motion-transmitting remote control cable assembly for transmitting motion along a curved path typically includes a flexible core element (strand) slidably enclosed within a flexible outer sheath (conduit) with end fittings attached to both ends of each respective member. These fittings attach to and react load from the conduit to its mounting points and from the strand to its mounting points. The core element is adapted at one end to be attached to a member to be controlled whereas the other end is attached to an actuator for longitudinally moving the core element within the outer sheath. The outer sheath is adapted to be secured by the fittings to a support structure.

These assemblies are often provided with means for adjusting the length of the strand or the conduit during installation and a lock to prevent change in length once installed. One approach has been to include a sliding lock which has teeth which slide into engagement with teeth of a longitudinally adjustable slider. For example, see U.S. Pat. Nos. 5,682,797, 5,161,428, and 4,418,583. While these prior devices are at least somewhat effective at locking the assembly at normal operating conditions, they can fail when excessive loads are applied. Accordingly, there is a need in the art for an improved locking device for a motion transmitting remote control cable assembly.

SUMMARY OF THE INVENTION

The present invention provides a locking device a motion-transmitting remote-control cable assembly which overcomes at least some of the above-noted problems of the related art. According to the present invention, a motion transmitting cable assembly includes, in combination, a flexible conduit extending along a central axis, a flexible core movable within the conduit along the central axis, and an adjuster body secured to the conduit and having a plurality of teeth. A slider body is movable along the adjuster body along the central axis. A lock body has a plurality of teeth and is operable with the slider body such that the lock body is movable between a disengaged position wherein the teeth of the lock body are disengaged from the teeth of the adjuster body to allow movement of the slider body relative to the adjuster body along the central axis and an engaged position wherein the teeth of the lock body are engaged with the teeth of the adjuster body to prevent movement of the slider body relative to the adjuster body along the central axis. The lock body includes a first section, a second section forming the plurality of teeth of the lock body, and a third section located between the first section and the second section and forming opposed lateral slots such that the lock body is generally I-shaped.

According to another aspect of the present invention, a motion transmitting cable assembly includes, in combination, a flexible conduit extending along a central axis, a flexible core movable within the conduit along the central axis, and an adjuster body secured to the conduit and having a plurality of teeth. A slider body is movable along the adjuster body along the central axis. A lock body has a plurality of teeth and is operable with the slider body such that the lock body is movable between a disengaged position wherein the teeth of the lock body are disengaged from the teeth of the adjuster body to allow movement of the slider body relative to the adjuster body along the central axis and an engaged position wherein the teeth of the lock body are engaged with the teeth of the adjuster body to prevent movement of the slider body relative to the adjuster body along the central axis. The lock body has opposed lateral slots formed therein. A fixed mounting bracket has an opening receiving the slider body therein and a slot extending from the opening to an edge of the mounting bracket with edges of the slot of the mounting bracket located in the slots of the lock body to interlock the lock body and the mounting bracket.

According to yet another aspect of the present invention, a motion transmitting cable assembly includes, in combination, a flexible conduit extending along a central axis, a flexible core movable within the conduit along the central axis, and an adjuster body secured to the conduit and having a plurality of teeth. A slider body is movable along the adjuster body along the central axis. A lock body has a plurality of teeth and is operable with the slider body such that the lock body is movable between a disengaged position wherein the teeth of the lock body are disengaged from the teeth of the adjuster body to allow movement of the slider body relative to the adjuster body along the central axis and an engaged position wherein the teeth of the lock body are engaged with the teeth of the adjuster body to prevent movement of the slider body relative to the adjuster body along the central axis. A fixed mounting bracket has an opening receiving the slider body therein. The lock body has a first section located at one side of the mounting bracket and interlocking with the slider body and a second section located on the other side of the mounting bracket and forming the plurality of teeth of the lock body.

According to yet another aspect of the present invention, a motion transmitting cable assembly includes, in combination, a flexible conduit extending along a central axis, a flexible core movable within the conduit along the central axis, and an adjuster body secured to the conduit and having a plurality of teeth. A slider body is movable along the adjuster body along the central axis. A lock body has a plurality of teeth and is operable with the slider body such that the lock body is movable between a disengaged position wherein the teeth of the lock body are disengaged from the teeth of the adjuster body to allow movement of the slider body relative to the adjuster body along the central axis and an engaged position wherein the teeth of the lock body are engaged with the teeth of the adjuster body to prevent movement of the slider body relative to the adjuster body along the central axis. A fixed mounting bracket has an opening receiving the slider body therein. The lock body has a snap lock which is located at an end of the lock body opposed to the mounting bracket and engagable with the slider body to releasably lock the lock body in the locking position.

According to yet another aspect of the present invention, a motion transmitting cable assembly includes, in combination, a flexible conduit extending along a central axis, a flexible core movable within the conduit along the central axis, and an adjuster body secured to the conduit and having a plurality of teeth. A slider body is movable along the adjuster body along the central axis. A lock body has a plurality of teeth and is operable with the slider body such that the lock body is movable between a disengaged position wherein the teeth of the lock body are disengaged from the teeth of the adjuster body to allow movement of the slider body relative to the adjuster body along the central axis and an engaged position wherein the teeth of the lock body are engaged with the teeth of the adjuster body to prevent movement of the slider body relative to the adjuster body along the central axis. A fixed mounting bracket has an opening receiving the slider body therein. The mounting bracket has an aperture spaced from the opening and the slider body has a snap-lock engageable with the aperture to releasably lock the slider body to the mounting bracket.

According to yet another aspect of the present invention, a motion transmitting cable assembly includes, in combination, a flexible conduit extending along a central axis, a flexible core movable within the conduit along the central axis, and an adjuster body secured to the conduit and having a plurality of teeth. A slider body is movable along the adjuster body along the central axis. A lock body has a plurality of teeth and is operable with the slider body such that the lock body is movable between a disengaged position wherein the teeth of the lock body are disengaged from the teeth of the adjuster body to allow movement of the slider body relative to the adjuster body along the central axis and an engaged position wherein the teeth of the lock body are engaged with the teeth of the adjuster body to prevent movement of the slider body relative to the adjuster body along the central axis. The lock body has opposed lateral slots formed therein. A fixed mounting bracket has an opening receiving the slider body therein and a slot extending from the opening to an edge of the mounting bracket with edges of the slot of the mounting bracket located in the slots of the lock body to interlock the lock body and the mounting bracket. The lock body has a first section located at one side of the mounting bracket and interlocking with the slider body and a second section located on the other side of the mounting bracket and forming the plurality of teeth of the lock body. The opposed lateral slots are located between the first section and the second section. The interlock between the first section of the lock body and the slider body includes a plurality of tabs of the first section of the lock body extending into a plurality of pockets formed in the slider body. The lock body has a snap lock located at an end of the lock body opposed to the mounting bracket and engagable with the slider body to releasably lock the lock body in the locking position.

From the foregoing disclosure and the following more detailed description of various preferred embodiments it will be apparent to those skilled in the art that the present invention provides a significant advance in the technology of motion-transmitting remote-control cable assemblies. Particularly significant high load bearing, easily assembled and disassembled, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 3 is a top plan view of a slider of the cable assembly of FIGS. 1 and 2;

FIG. 4 is a right side elevational view of the slider of FIG. 3;

FIG. 5 is a rear end elevational view of the slider of FIGS. 3 and 4.

FIG. 6 is a cross-sectional view of the slider of FIGS. 3 to 5 taken along line 6—6 of FIG. 4;

FIG. 7 is a cross-sectional view of the slider of FIGS. 3 to 6 taken along line 7—7 of FIG. 4;

FIG. 17 a perspective view, similar to FIG. 12, showing a second embodiment of the mounting bracket for use with the cable assembly of FIG. 16; and FIG. 18 is a perspective view, similar to FIG. 13, showing the cable assembly of FIG. 16 secured to the mounting bracket of FIG. 17, with various components removed for clarity.

Figure 1:
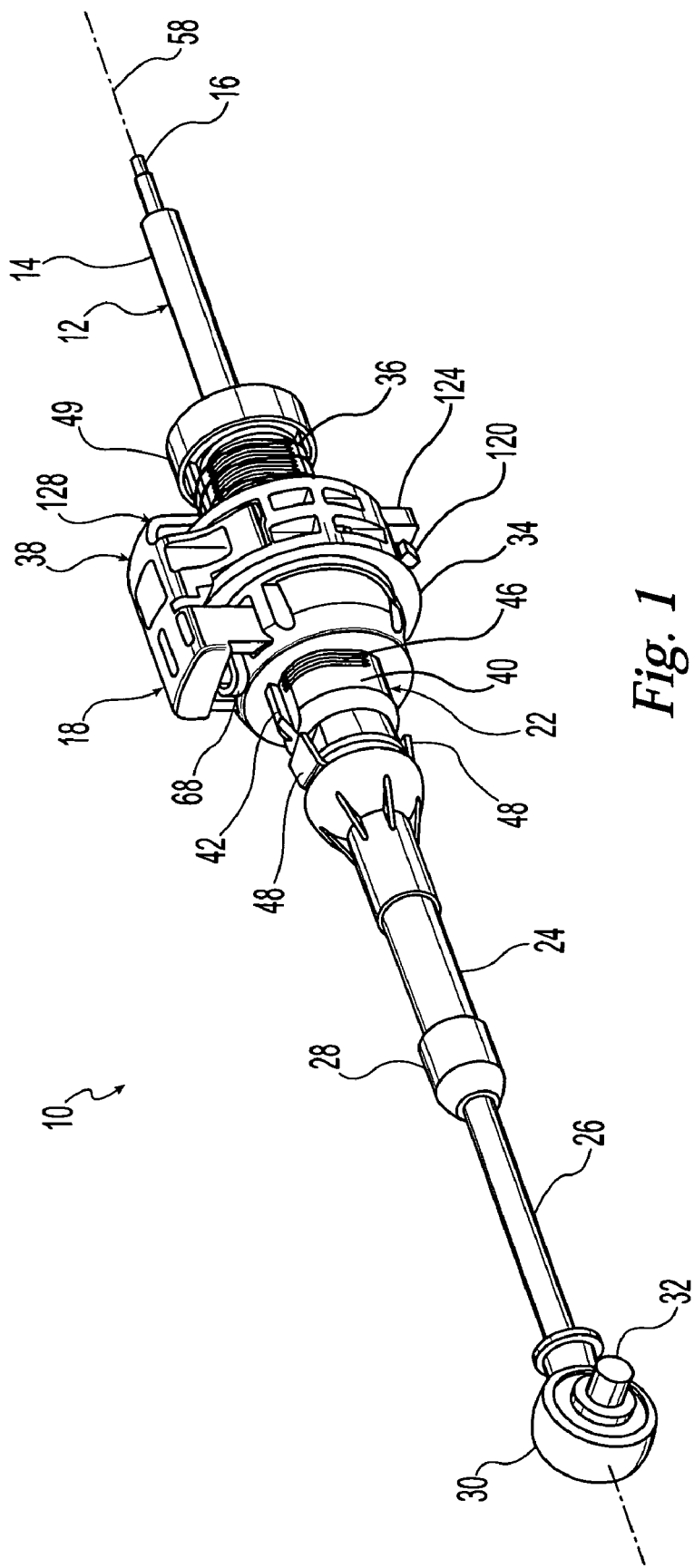
FIG. 1 is a perspective view of a cable assembly according a preferred embodiment of the present invention.

It should be understood that the appended drawings are not necessarily to scale, presenting a somewhat simplified representation of various preferred features illustrative of the basic principles of the invention. The specific design features of the remote-control cable assembly as disclosed herein, including, for example, specific dimensions, orientations, and shapes of the lock element, slider element, and mounting bracket will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the remote control cable assemblies illustrated in the drawings. In general, up or upward refers to an upward direction generally in the plane of the paper in FIG. 1 and down or downward refers to a downward direction generally in the plane of the paper in FIG. 1. Also in general, fore or forward refers to a direction toward the left generally in the plane of the paper in FIG. 1 and aft or rearward refers to a direction toward the right generally in the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved motion-transmitting remote control cable assemblies disclosed herein. The following detailed discussion of various alternative and preferred embodiments will illustrate the general principles of the invention with reference to a remote control cable assembly for use with a motor vehicle transmission system. Other embodiments suitable for other applications will be apparent to those skilled in the art given the benefit of this disclosure.

The term "snap-fit" or "snap-lock" is used herein and in the claims to mean a connection between at least two components wherein at least one of the components has a protrusion and/or abutment which engages the other component to form an interlock or interference which retains the components together when they are connected and at least one of the components has a resiliently deformable or deflectable portion such that the deflectable portion deflects to remove the interference as the parts are brought together and resiliently snaps back to reform the interference when the components are together. The term "unitary" member is used herein and in the claims to mean a member made of a single continuous material, such as, for example a molded component. The term "integral" members is used herein and in the claims to mean members that are secured together such as, for example, two members connected by overmolding.

Figure 2:
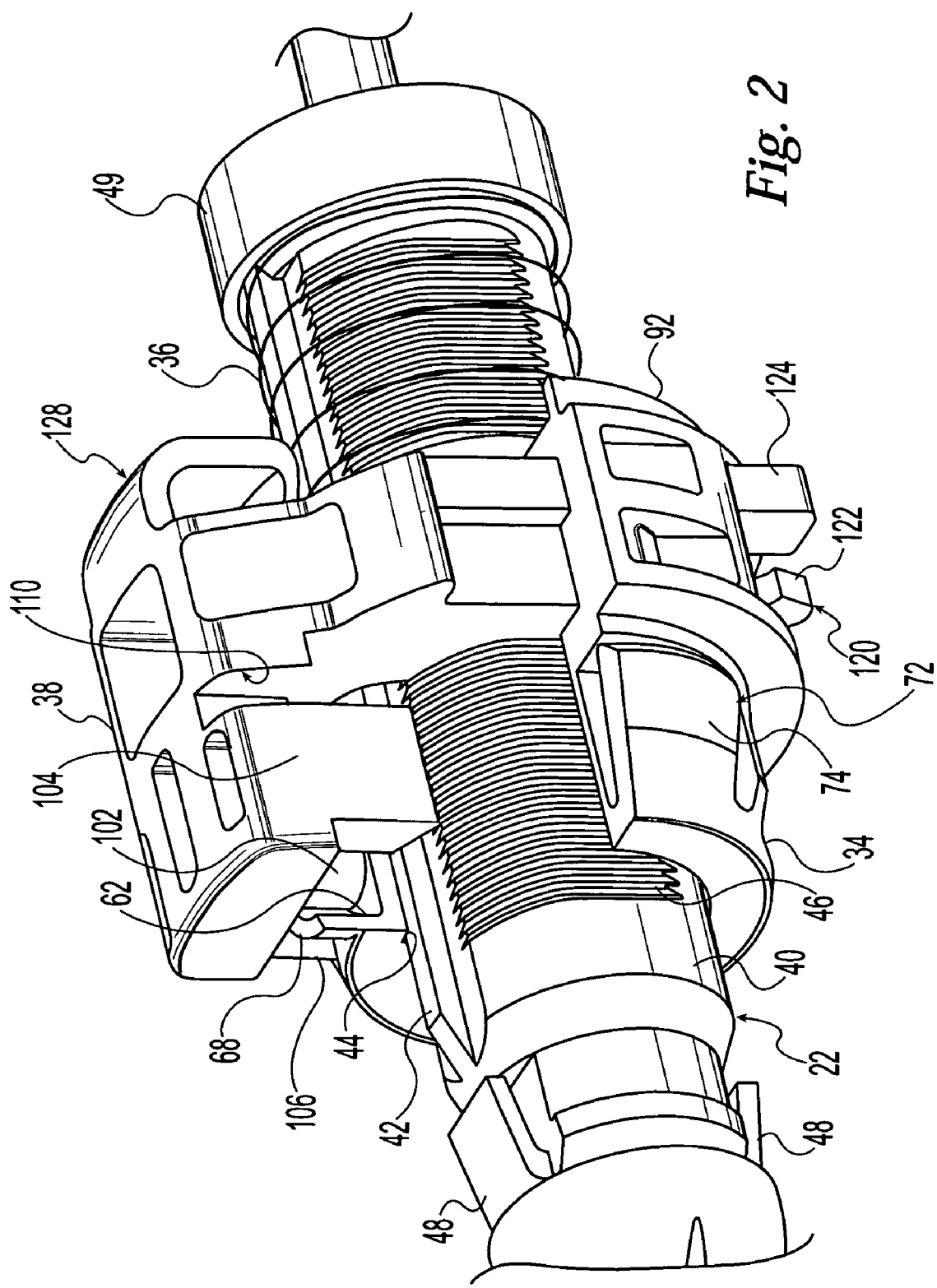
FIG. 2 is an enlarged perspective view of a portion of the cable assembly of FIG. 1 with portions of a slider removed for clarity.
Figure 9:
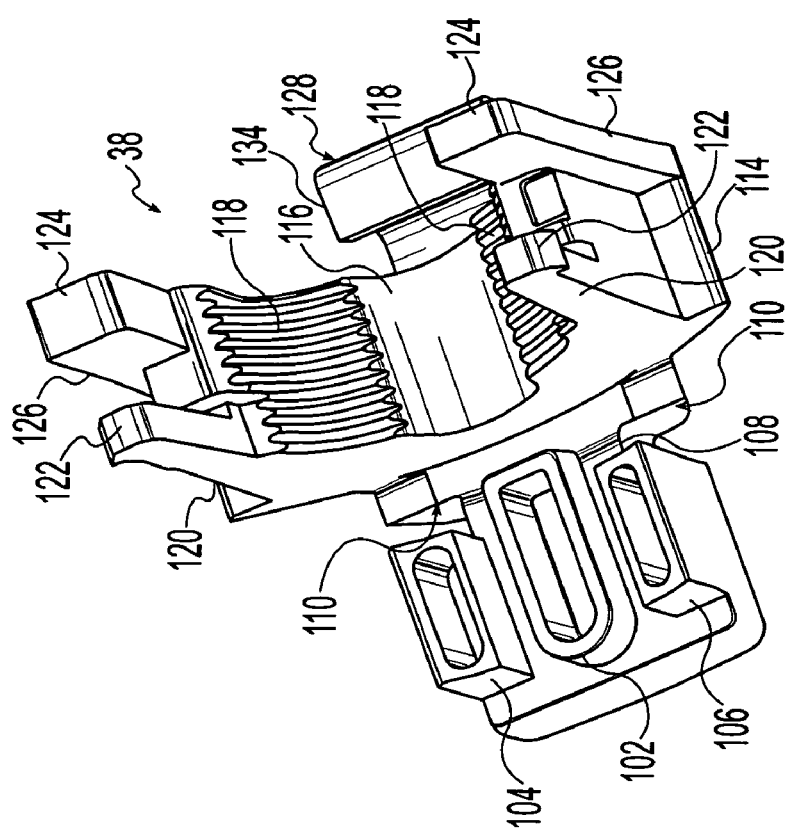
FIG. 9 is another perspective view of the lock body of FIG. 8.
Figure 8:
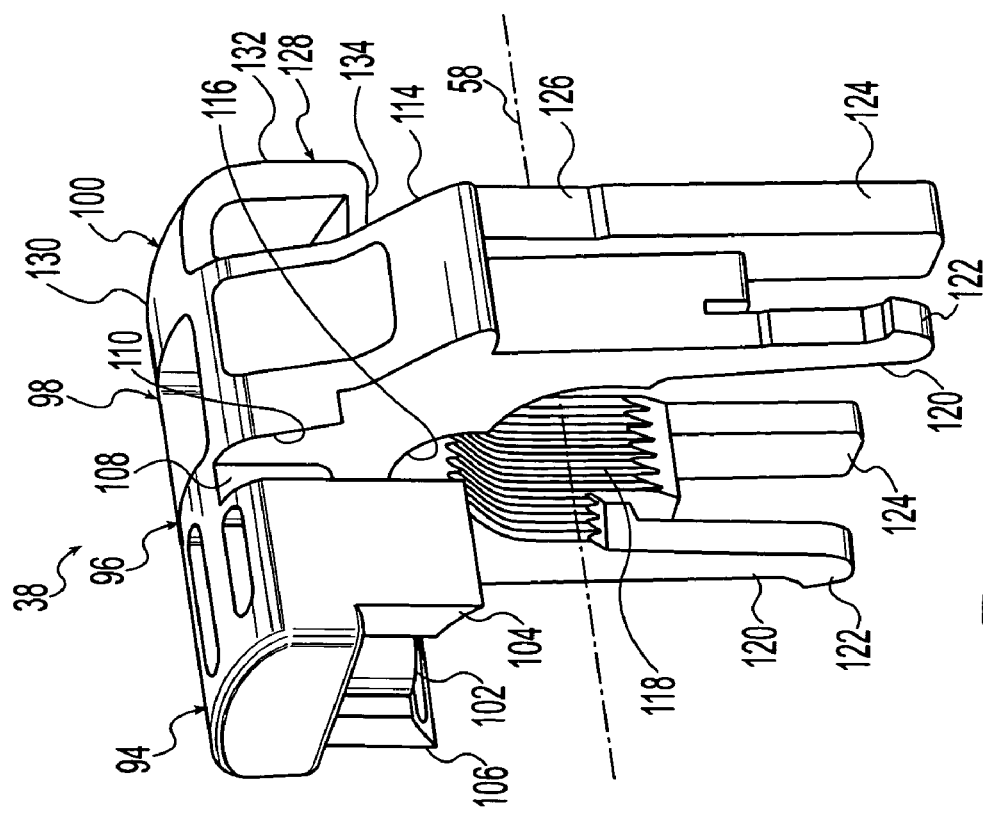
FIG. 8 is a perspective view of a lock body of the cable assembly of FIGS. 1 and 2.
Figure 11:
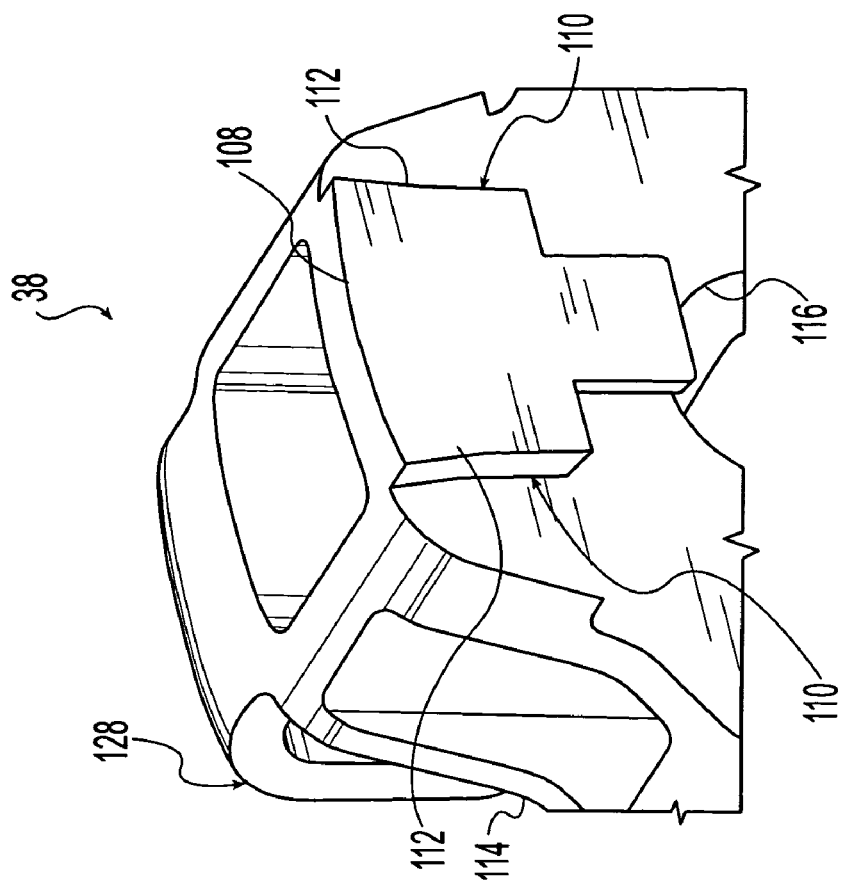
FIG. 11 is a perspective view, in cross-section, of the of the lock body of FIGS. 8 to 10.
Figure 10:
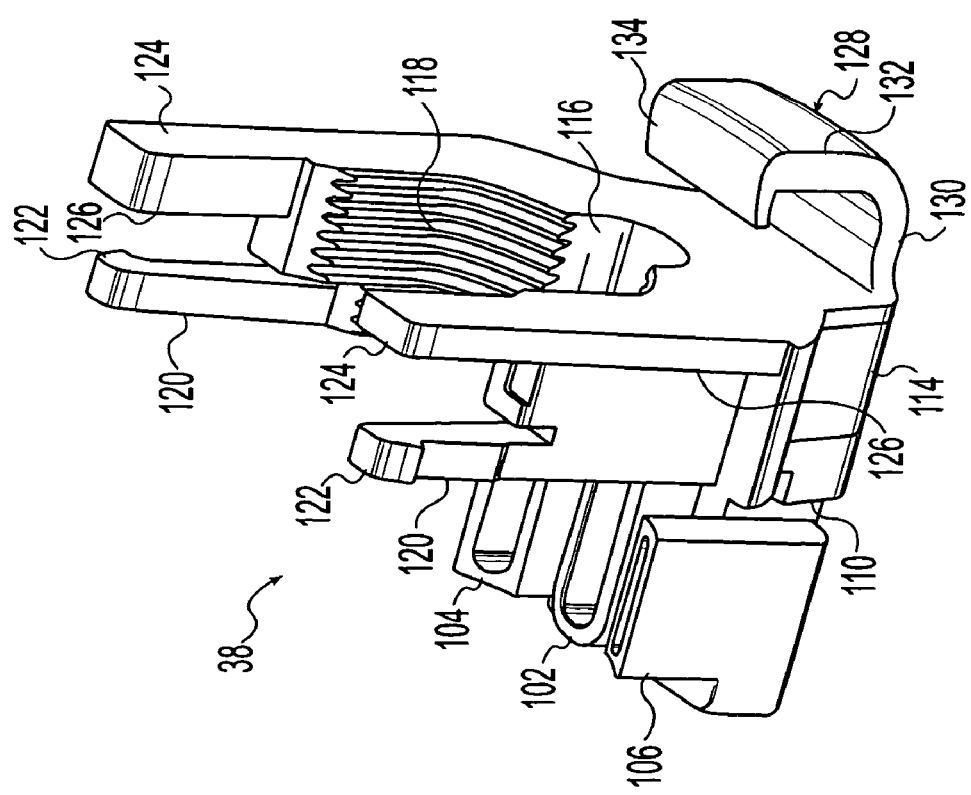
FIG. 10 is another perspective view of the lock body of FIGS. 8 and 9.

Referring now to the drawings, FIGS. 1 and 2 shows a remote control cable assembly 10 for a transmission shift assembly of a motor vehicle, such as an automobile, according to a preferred embodiment of the present invention. While the illustrated embodiments of the present invention are particularly adapted for use with an automobile, it is noted that the present invention can be utilized with any motor vehicle having a control cable including trucks, buses, vans, recreational vehicles, earth moving equipment and the like, off road vehicles such as dune buggies and the like, air borne vehicles, and water borne vehicles. While the illustrated embodiments of the present invention are particularly adapted for use with a transmission shift assembly, it is also noted that the present invention can be utilized with other motor vehicle systems such as, for example, the parking brake, accelerator, hood release, brake release, trunk release, park lock, tilt wheel control, fuel filler door, and hydraulic control cables. While the illustrated embodiments of the present invention are particularly adapted for the transmission end of the cable in the transmission shift assembly, it is further noted that features of the present invention can be utilized at the shifter end of the cable in the transmission shift assembly.

As shown in FIG. 1, the illustrated remote control cable assembly 10 includes flexible cable 12 having a flexible outer sheath or conduit 14 and a flexible inner core or strand 16 longitudinally slidable within the conduit 14. One end of the conduit 14 is secured to a locking device or adjustment assembly 18 which is secured to a fixed-position mounting bracket 20 (FIG. 13) and permits adjustment of the length of the cable assembly 10 during assembly to the motor vehicle as described in more detail hereinafter. The conduit 14 is rigidly secured to a tubular-shaped end fitting or adjuster body 22. A swivel tube member 24 is preferably connected to the forward end of the adjuster body 22 by a swivel joint to allow for swiveling movement of the tube member 24 relative to adjuster body 22 and the conduit 14 secured thereto. One end of the strand 16 extends longitudinally through the conduit 14 and the adjuster body 22 and is rigidly connected to a rod member 26 which is slidably received within the swivel tube member 24 for sliding longitudinal movement therein. The illustrated swivel tube member 24 is provided with a wiper seal 28 to minimize the entry of contaminants into the swivel tube member 24. A rod-end 30 is rigidly secured to the end of the rod member 26 for connection to a control member 32 such as the illustrated pin of a motor vehicle transmission.

The other end of the conduit 14 and the strand 16 are operatively connected to an actuator such as a shifter mechanism so that longitudinal movement of the strand 16 moves the rod member 26. The rod member 26 longitudinally moves within the tube member 24 to define a line of force as the rod member 26 is actuated to axially move into and out of the tube member 24. Thus longitudinal movement of the strand 16 and the rod member 26 actuates the control member 32. The flexible conduit and strand 14, 16 allow the cable assembly 10 to be routed along a desired path, which is typically not linear. The swivel tube member 24 allows the orientation of the rod member 26 relative to the adjuster body 22 to be adjusted to account for any misalignment of the control member 32 and the mounting bracket 20 due to manufacturing tolerances and the like. The adjustment assembly 18 allows the effective length of the cable assembly 10 to be adjusted to account for any variances in length between the control member 32 and the mounting bracket 20 due to manufacturing tolerances and the like.

As best shown in FIGS. 1 and 2, the adjustment assembly or locking device 18 includes the adjuster body or end fitting 22, a slider or slider body 34 which is longitudinally adjustable along the adjuster body 22, a spring member 36 which resiliently biases the slider 34 toward the forward end of the adjuster body 22, and a lock element or lock body 38 which is selectively moved between a shipping or installing position (FIG. 15) which permits longitudinal movement of the slider 34 along the adjuster body 22 and a locking or operating position (FIG. 13) which secures the slider 34 at a fixed position along the adjuster body 22.

The adjuster body 22 is generally tubular shaped having a generally cylindrical shaped outer surface 40 and a longitudinally extending central passage. The adjuster body 22 is preferably of unitary construction and molded of a plastic material. It is noted that the adjuster body 22 can alternatively be of integral construction and/or formed at least partially of other suitable materials. A pair longitudinally extending keys or flanges 42 are provided at the top and bottom of the outer surface 40 which cooperate with keyways or slots 44 of the slider 34 to orient the slider 34 relative to the adjuster body 22 and permit longitudinal movement of the slider 34 along the outer surface 40 of the adjuster body 22. The outer surface 40 is also provided with has a series of longitudinally spaced-apart serrations or teeth 46 on opposed sides which are sized and shaped to cooperate with the lock body 38 as described in more detail hereinafter. The illustrated forward end is provided with a pair of opposed radially extending tabs 48 which form rearward facing abutment surfaces sized and shaped for engagement by the slider 34 to limit forward movement of the slider 34 along the adjuster body 22. The illustrated rear end of the adjuster body 22 is provided with a flange 49 forming a forward facing abutment or shoulder sized and shaped for engagement by the spring member 36.

As best shown in FIGS. 3 to 7, the slider 34 has a first or forward portion 50, a second or rearward portion 52, and a third or intermediate portion 54 located between first and second portions 50, 52. The slider 34 is preferably of unitary construction and molded of a plastic material. It is noted that the slider 34 can alternatively be of integral construction and/or formed at least partially of other suitable materials. The slider 34 is preferably of unitary construction and molded of a plastic material. It is noted that the slider 34 can alternatively be of integral construction and/or formed at least partially of other suitable materials. Slider 34 has a through-passage 56 extending axially along the central longitudinal axis 58. The passage 56 is sized an shaped to closely receive the outer surface 40 of the adjuster body 22 therein. The longitudinally extending key-ways or slots 44 are provided at the top and bottom of the passage 56.

The forward portion 50 has an interlock area 60 which includes a plurality of circumferentially-spaced bores or pockets 62, 64, 66 formed in the outer radial surface. The illustrated slider 34 has a first or main pocket 62 formed at the top a pair of side pockets 62, 64 adjacent thereto on lateral sides of the main pocket 62. The main pocket 62 has a collar portion or wall 68 that extends radially from the outer surface of the forward portion to outwardly encircle the main pocket 62. The interlock area 60 is sized and shaped to cooperate with the lock body 38 as described in more detail hereinafter. A cylindrically shaped outer surface 70 is provided at the rear of the forward portion 50 adjacent the intermediate portion 54. The illustrated outer surface 70 is interrupted at the top by the collar portion 68 of the main pocket 62. The outer surface 70 is sized and shaped for receiving the mounting bracket 20 as described in more detail hereinafter. The forward portion 50 is also provided with a snap ring or snap-lock 72. The snap ring 72 is of circumferentially split construction forming a pair of axially extending wings 74 that are cantileveredlly attached at a forward end and the opposite free rear end is facing the intermediate portion 54. Under the wings 74 are gaps that permit the wings 74 to be resiliently flexed radially inwardly. The wings 74 angle radially outward in a rearward direction and the free rear ends of the wings 74 form rearward facing abutments.

The intermediate portion 54 has spaced apart forward and rearward walls 76, 78 and a circumferential necked down portion located therebetween. The forward wall 76 is contiguous with the outer surface 70 of the forward portion 50 o form a forward facing abutment for engaging the mounting bracket 20. Between the walls 76, 78, a pair of laterally spaced apart and vertically extending guide ways or passages 80 are formed for receiving the lock body 38. The illustrated passages 80 have a forward portion 82 having a first or upper pair of opposed abutments 84 formed generally mid way along the passage 80 and a second or lower pair of opposed abutments 86 formed at the bottom of the passages 80. The illustrated lower abutments 86 are form at outer lateral sides of the passages 80. The illustrated passages 80 have a rear portion 88 which have guide slots 90 extending laterally outward for the entire vertical height of the passages 80. The abutments and guide slots 84, 86, 90 are sized and shaped to cooperate with the lock body 38 as described in more detail hereinafter.

The illustrated rearward portion 52 is formed by a circular shaped end wall or flange 92 rearwardly extending from the rear wall of the intermediate portion. The radially inner side surface of the flange 92 forms an arcuate inwardly facing abutment sized and shaped to cooperate with the lock body 38 as described in more detail hereinafter.

The illustrated spring member 36 is a compression helical-coil spring encircling the adjuster body 22 and acting between the rearward wall 78 of the slider 34 and the flange 49 at the rear end of the adjuster body 22. In a shipping condition, the spring member 36 resiliently biases the slider 34 forward against the rearward facing abutment of the tabs 48 at the front of the adjuster member 22. It is noted that the spring member 36 can be other suitable types of springs within the scope of the present invention.

As best shown in FIGS. 8 to 11, the illustrated lock body 38 has a front section 94, an intermediate section 96, a finger section 98, and a rear section 100. The lock body 38 is preferably of unitary construction and molded of a plastic material. It is noted that the lock body 38 can alternatively be of integral construction and/or formed at least partially of other suitable materials. The front section 94 forwardly extends from intermediate section 96 in an axial direction and has a plurality of inwardly extending interlock tabs 102, 104, 106 in a radial direction. The tabs 102, 104, 106 are sized and shaped to cooperate with the pockets 62, 64, 66 in the interlock area 60 of the slider 34. The illustrated lock body 38 has a central tab 102 sized to closely fit within the central pocket 62 and a pair of opposed side tabs 104, 106 on adjacent sides of the central tab 102 sized to closely fit within the second and third pockets 64, 66. The illustrated side tabs 104, 106 have arcuate inner surfaces shaped to closely conform to the cylindrically-shaped outer surface of the adjuster body 22. It is noted that the location of tabs 102, 104, 106 and pockets 62, 64, 66 could be reversed if desired, that is, the tabs 102, 104, 106 could be located on the adjuster body 22 if the pockets 62, 64, 66 are located on the lock body 38.

The intermediate section 96 forms a bridge or wall 108 between the front and finger sections 94, 98. The intermediate section 96 also forms a pair of opposed slots 110 on lateral sides of the intermediate section 96 which are sized and shaped to cooperate with the mounting bracket 20. A radially inner width between the slots 110 is formed by the central tab 102 which extends rearwardly to form the bottom of the slots 110. A radially intermediate width between the slots 110 is sized to closely receive the mounting bracket 20 as described in more detail hereinafter. A radially outer width between the slots has a taper or ramp 112 such that the width between the slots 110 increases in an radially outward direction.

The finger section 98 has a body portion 114 which includes an arcuate surface 116 sized and shaped to cooperate with the outer surface of the adjuster body 2. The arcuate surface 116 is also provided with has a series of longitudinally spaced-apart serrations or teeth 118 on opposed sides which are sized and shaped to cooperate with the teeth 46 of the adjuster body 22. Cantilevered from opposed lateral sides of the arcuate surface 116 at a forward end of the finger section 98 are a pair of downwardly extending and laterally spaced apart fingers 120. The fingers 120 are sized and shaped to cooperate with the forward portion 82 of the passages 80 of the slide 34. Each of the fingers 120 has an outwardly facing barb 122 at it's free end forming an upwardly facing abutment. The barbs 122 are sized and shaped to cooperate with the abutments 84, 86 in the slider passages 80 as described in more detail hereinafter. Cantilevered from opposed lateral sides of the arcuate surface 116 at a rearward end of the finger section 98 are a pair of downwardly extending and laterally spaced apart support members 124. The fingers 120 are located adjacent intermediate section 96 and spaced axially apart from the support members 124 which are adjacent the rear section 100. The support members 124 are sized and shaped to cooperate with the rear portion 88 of the slider passages 80. The support members 124 each have an outwardly extending flange or guide 126 sized and shaped to cooperate with the guide slots 90 of the slider passages 80.

The rear section 100 rearwardly extends in an axial direction from the finger section 98 and forms a rear snap tab or snap lock 128. The rear snap tab 128 has a first wall 130 cantilevered and rearwardly extending from the top of the finger section 98 and a second or rear wall 132 downwardly cantilevered and radially extending from the rear free end of the first wall 130. A hook portion 134 extends from the free lower end of the second wall 132 and extends back forward toward finger section 98. The hook portion 134 forms an upwardly facing abutment for cooperating with the slider 34 as described in more detail hereinafter. The illustrated abutment is arcuate and sized and shaped to cooperate with the flange 92 of the slider rearward portion 52.

The arcuate surface 116 is formed on the inside surface of finger section 98, bridges axially from fingers 120 to the support members 124 and radially separates each of the fingers 120 and the support members 124. The series of serrations or teeth 118 are formed on the inside surface of arcuate surface 116, that cooperate with the teeth or serrations 46 on the outer surface of the adjuster body 22 as will be discussed hereinafter.

Figure 12:
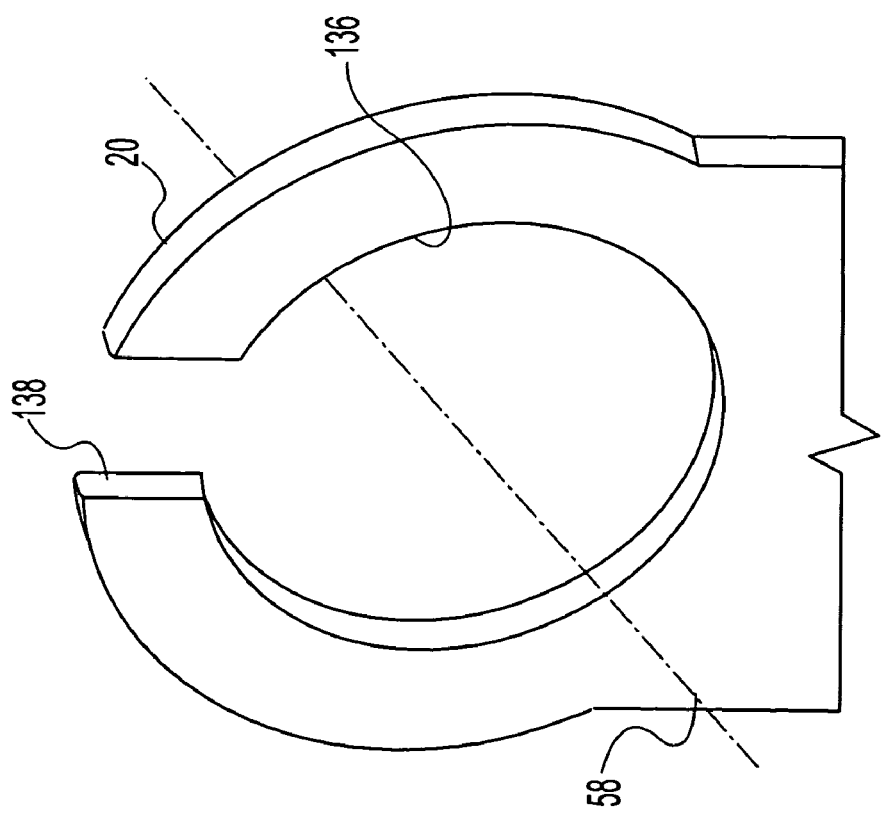
FIG. 12 is a perspective view of a mounting bracket for use with the cable assembly of FIGS. 1 and 2.

As best shown in FIG. 12, the mounting bracket or wall 20 has a circular opening 136 sized and shaped to encircle the slider 34. The opening 136 is smaller radially then the outermost radial portion of the slider wings 74 and larger than the necked down portion of the slider intermediate portion 54 and the conduit 14. The mounting bracket 20 forms a part of a support structure to support the cable assembly 10 at a desired location. The mounting bracket 20 may be an arm of support a structure and may also be part of a bulkhead or panel through which the cable assembly extends. A radially extending slot 138 extends from the inner surface of the opening 136 to the outer surface of the mounting bracket 20.

Figure 13:
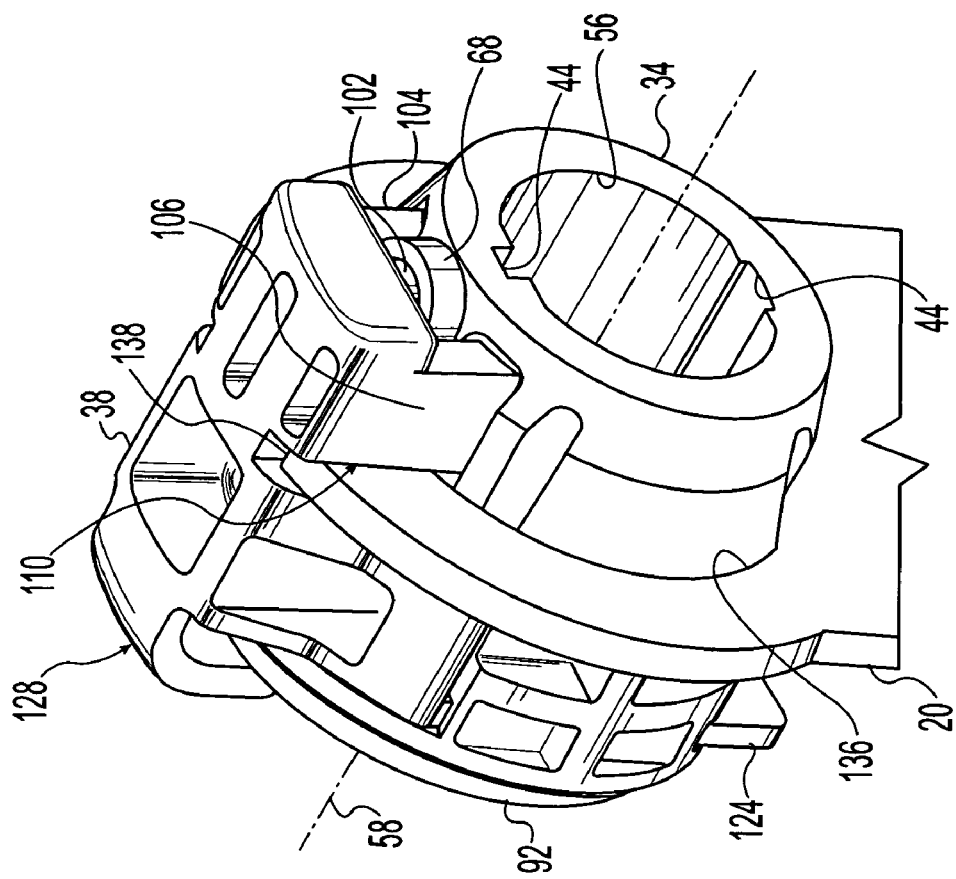
FIG. 13 is a perspective view of the cable assembly of FIGS. 1 and 2 secured to the mounting bracket of FIG. 12, with various components removed for clarity.
Figure 14:
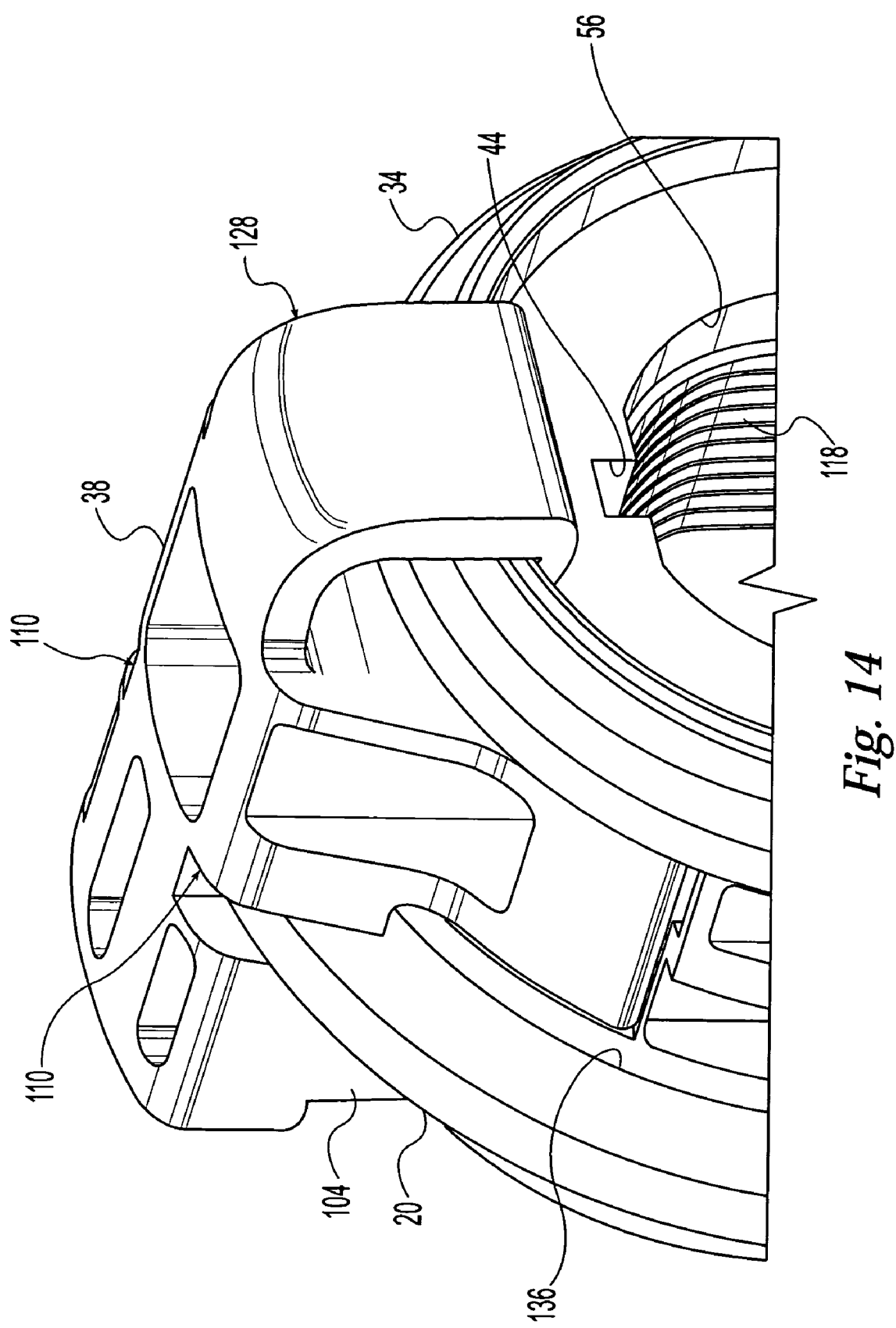
FIG. 14 is a left-rear perspective view of a portion of the cable assembly of FIG. 13 showing a rear locking tab, with various components removed for clarity.

As best shown in FIGS. 13 and 14, when it is desired to attach the cable assembly 10 to the mounting bracket 20, the slider 34 is rotated to radially align the collar portion 68 of the slider 34 with the slot 138 of the mounting bracket 20 and the forward portion 50 of the slider 34 is inserted axially into the opening 136 of the mounting bracket 20 As this occurs, the slider wings 74 are resiliently compressed inward and with further axial movement through the opening 136 of the mounting bracket 20, the mounting bracket 20 engages the slider forward wall 76 and becomes disposed in the necked down portion of the intermediate portion 54 with the collar portion 68 partially located in the slot 138 of the mounting bracket opening 136. Once the mounting bracket 20 is rearward of the slider wings 74, the wings 74 resiliently move radially outward to capture the mounting bracket 20 between the abutment formed by the free end of the wings 74 and the forward wall 76 of the intermediate portion 54.

Once the slider 34 is secured to the mounting bracket 20, any needed axial location adjustment is made in the cable assembly 10 and the lock body 38 is downwardly inserted into slider passages 80 to the locked position so that the teeth or serrations 46 on the outer surface of adjuster body 22 engage the teeth or serrations 118 on the lock body 38. When the teeth or serrations 46, 118 engage each other, they form an interlock which limits and preferably prevents relative axial movement between the slider 34, the lock body 38 and the adjuster body 22. When the teeth or serrations 46, 118 are fully engaged, the barbs 122 of the fingers 120 extend beyond the lower abutments 86 of slider 34, the abutments of the barbs 122 engage the lower abutments 86 in the forward portion 82 of the slider passages 80 to form a radial interlock which secures the lock body 38 to the slider 34. The support members 124 are located within the rear portion 88 of the slider passages 80 with the guides 126 in the guideways 90 to form an axial interlock which limits relative axial movement between the lock body 38 and the slider 34.

With the lock body 38 in the locking position, the mounting bracket 20 extends into the slots 110 of the lock body intermediate section 96 to form an axial interlock which prevents relative axial movement between the lock body 38 and the mounting bracket 20 and an anti-rotation lock which prevents relative rotation between the lock body 38 and the mounting bracket 20. The lock body 38 extends through the slot 138 of the mounting plate 20 and forms abutments on each side of the mounting bracket to form an I-beam configuration. By sandwiching the mounting bracket 20 between the front section 94 and the finger section 98, the adjustment assembly 18 is not extracted from the mounting bracket 20 if excessive loads fail the mounting wings 74 of the slider 34. The mounting bracket 20 engages the ramp or wedge-112 of intermediate section 96 within the slots 110 to eliminate lateral free play between the mounting bracket 20 and the lock body 38. The ramp feature in the slots 110 provides tolerance take-up and anti-rattle functions. The adjustment assembly 18 is tightly held by the slot interfaces and the ramps. This tight fit also helps in reducing cable lash.

With the lock body 38 in the locked position, the interlock tabs 102, 104, 106 of the lock body front section 94 are located within the pockets 62, 64, 66 of the slider forward portion 50 to form an axial and rotational interlock which limits both relative axial and rotational movement between the slider 34 and the lock body 38. The interlock between the slider 34 and the lock body 38 assists in carrying excessive load.

As the lock body 38 is moved to the locking position, the rear snap-lock 128 is rearwardly deflected by the flange 92 of the slider rearward portion 52 and resiliently snaps back forward once below the flange 92 so that the abutment engages the flange 92. The snap lock hook portion 134 engages the abutment formed by the flange 92 to form a radial interlock which limits relative radial movement between the lock body 38 and the slider 34 to secure the lock body 38 in the locking position. The rear snap tab 128 is a secondary lock to carry excessive load. The rear snap-lock 128 clamps the lock body 38 to the adjuster body 22 in the locking position, thus giving the engagement teeth 46, 118 stronger holding capability. This lets the adjustment assembly 18 perform better at higher loads and reduced system lash due to of higher loads. In prior art designs, the locking teeth have a tendency to push the lock body 38 up in the rear and out o engagement because of axial loading against the angles of the teeth. By providing a snap-lock 128 at the rear of the lock body 38 the lock body 38 is kept in place to reduces system lash.

The lock body 38 also assists the whole adjustment assembly 18 function at excessive loads. The whole adjustment assembly 18 can be removed. By creating the interlock design, if the slider wings 74 that hold the assembly to the mounting bracket 20 fail, the lock body 38 continues to hold the assembly in place at the mounting bracket 20. The lock body 38 is also designed to interface with the slider 34 in a more robust manner by increasing the amount of contact area for better load distribution. This ensures that the adjustment assembly 18 maintains its position during excessive loads.

Figure 15:
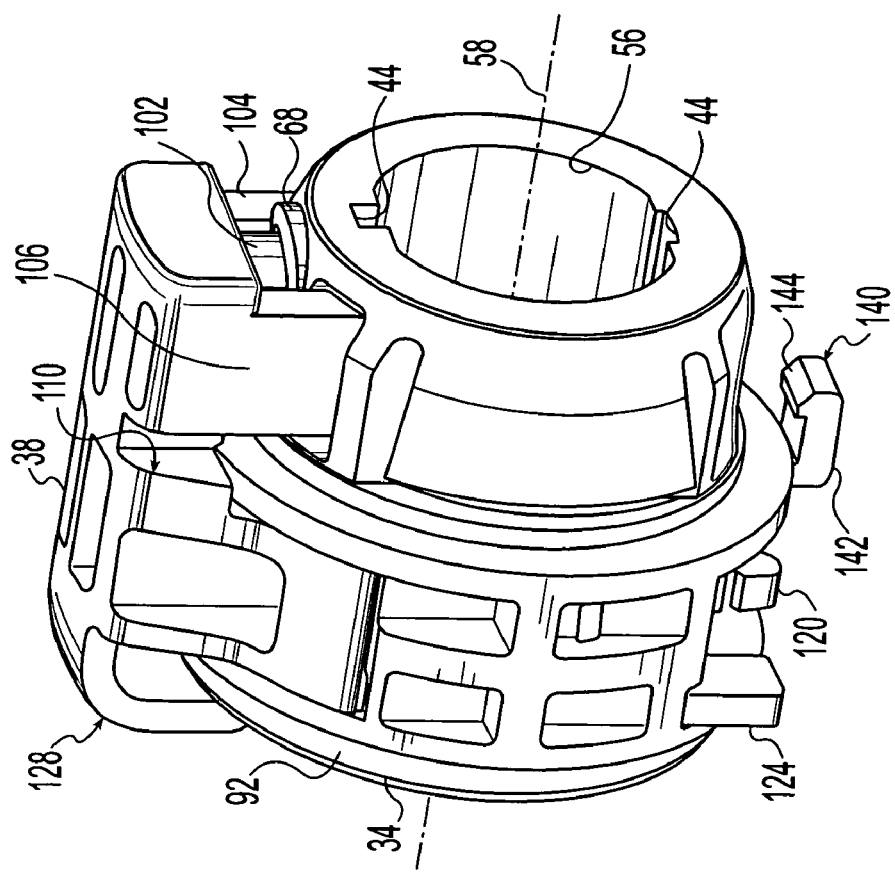
FIG. 15 a perspective view, similar to FIG. 13, showing the lock body in a shipping position.

As best shown in FIG. 15, The lock body 38 is preferably shipped in the shipping or installing position wherein the lock body 38 is only partially inserted into the slider 34. In this position, the lock body 38 creates no interlocks so that the slider 34 is free to move relative to the adjuster body 22 as the slider 34 is inserted into the opening 136 of the mounting bracket 20. The lock body 38 is held in the shipping position by the finger barbs 122 located in the upper abutments 84 of the slider passage 80. From the shipping position, the locking body 38 is easily moved downward to the locking position when desired.

Figure 16:
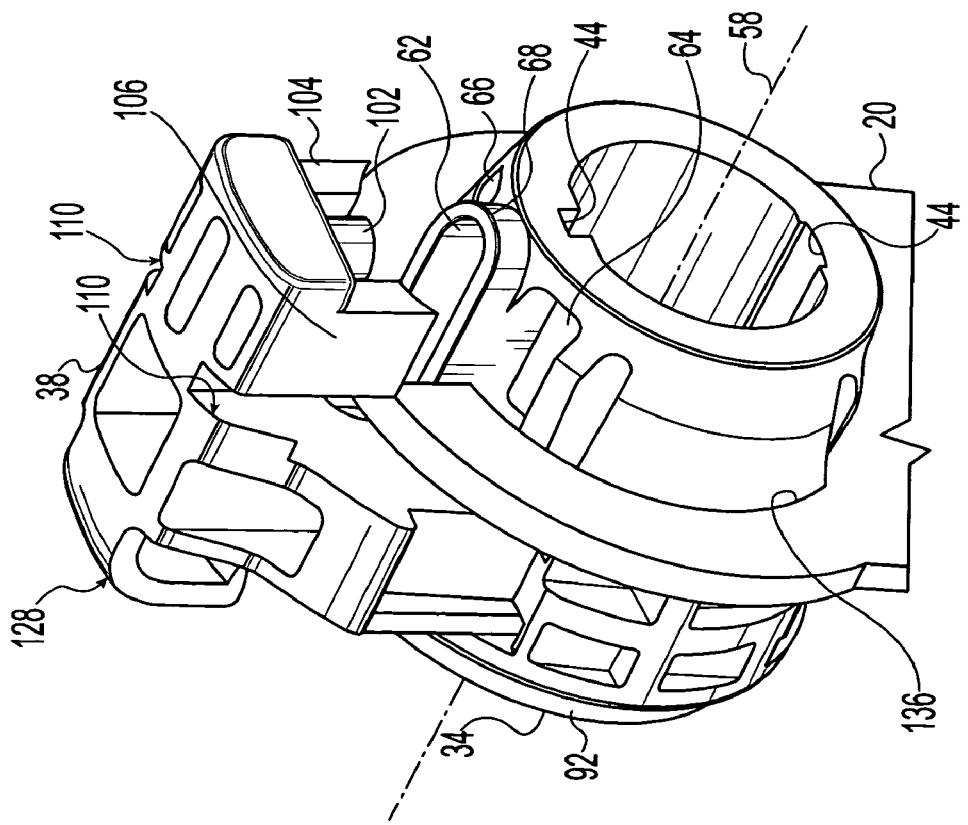
FIG. 16 is a perspective view showing a second embodiment of the cable assembly according to the present invention.

FIGS. 16 to 18 show a second embodiment of the cable assembly 10 according to the present invention wherein like references numbers are used for like structure. The second embodiment is substantially the same as the first embodiment except that a lower snap-lock 140 is provided between the slider 34 and the mounting bracket 20. If additional robustness is desired to prevent the adjustment assembly 18 from unlocking, a lock tab 142 is provided at the forward end of the slider 34 and at the bottom of the slider 34 opposite the pockets 62, 64, 66 located at the upper side. The lock tab 142 extends radially from the forward wall 76 of the finger section 98 and extends axially toward the front end of front section 94. The lock tab 104 has a barb 144 at its free end forming a rearward facing abutment. The mounting bracket 20 has an aperture 146 located below the opening 136 to receive the lock tab 104 therein. The aperture 146 is sized, shaped, and located to cooperate with and engage the barb 144 to create an axial interlock and lock the slider 34 to the mounting bracket 20. The abutment of the lock tab 142 engages the forward side of the mounting bracket 20 to prevent rearward movement of the slider 34 relative to the mounting bracket 20. The barb 144 reduces the possibility of separation due to a bending force between slider 34 and the mounting bracket 20 and added robustness to the assembly 10. During installation, a camming surface of the lock tab 142 engages the mounting bracket 20 to deflect the lock tab 142 so that it passes through the aperture 146. Once through the aperture 146, the lock tab 142 resiliently snaps back to form the interlock between the slider 34 and the mounting bracket 20.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the slider 34 and lock body 38 can each have many different configurations and can be formed of many different materials. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A motion transmitting cable assembly comprising, in combination:
    a flexible conduit extending along a central axis;
    a flexible core that moves within the conduit along the central axis;
    an adjuster body secured to the conduit and having a plurality of teeth;
    a slider body that moves along the adjuster body along the central axis;
    a lock body having a plurality of teeth that moves relative to the slider body to releasably lock the slider body to the adjuster body;
    wherein the teeth of the lock body are engaged with the teeth of the adjuster body when the lock body is in an engaged position to prevent movement of the slider body relative to the adjuster body along the central axis;
    wherein the lock body includes a front section, a rear section forming the plurality of teeth of the lock body, and an intermediate section located between the front section and the rear section and forming opposed lateral slots; and
    a fixed mounting bracket extending into the slots to interlock the lock body and the mounting bracket.

2. The motion transmitting cable assembly according to claim 1, wherein the lock body is of unitary one-piece construction and molded of plastic.

3. The motion transmitting cable assembly according to claim 1, wherein the mounting bracket has an opening receiving the slider body therein and a slot extending from the opening to an edge of the mounting bracket, and edges of the slot of the mounting bracket are located in the slots of the lock body.

4. The motion transmitting cable assembly according to claim 3, wherein the slots of the lock body are at least partially wedge shaped to ensure engagement with the edges of the slot of the mounting bracket.

5. The motion transmitting cable assembly according to claim 1, wherein front section of the lock body interlocks with the slider body.

6. The motion transmitting cable assembly according to claim 5, wherein the interlock between the front section of the lock body and the slider body includes a plurality of tabs of the front section of the lock body extending into a plurality of pockets formed in the slider body.

7. The motion transmitting cable assembly according to claim 1, wherein the rear section of the lock body has a snap lock located at an end of the rear section of the lock body opposed to the front section of the lock body that engages the slider body to releasably lock the lock body to the slider body.

8. The motion transmitting cable assembly according to claim 1, wherein the fixed mounting bracket has an aperture spaced from the opening and wherein the slider body has a snap-lock that engages the aperture to releasably lock the slider body to the mounting bracket.

9. The motion transmitting cable assembly according to claim 8, wherein the snap-lock of the slider body is located at a side of the slider body opposite the front section of the lock body.

10. A motion transmitting cable assembly comprising, in combination:

a flexible conduit extending along a central axis;
a flexible core that moves within the conduit along the central axis;
an adjuster body secured to the conduit and having a plurality of teeth;
a slider body that moves along the adjuster body along the central axis;
a lock body having a plurality of teeth that moves relative to the slider body to releasably lock the slider body to the adjuster body;
wherein the teeth of the lock body are engaged with the teeth of the adjuster body when the lock body is in an engaged position to prevent movement of the slider body relative to the adjuster body along the central axis;
wherein the lock body has opposed lateral slots formed therein; and
a fixed mounting bracket having an opening receiving the slider body therein and a slot extending from the opening to an edge of the mounting bracket with edges of the slot of the mounting bracket located in the slots of the lock body to interlock the lock body and the mounting bracket.

11. The motion transmitting cable assembly according to claim 10, wherein the lock body includes a front section, a rear section forming the plurality of teeth of the lock body, and an intermediate section located between the front section and the rear section and forming opposed lateral slots.

12. The motion transmitting cable assembly according to claim 10, wherein the slots of the lock body are at least partially wedge shaped to ensure engagement with the edges of the slot of the mounting bracket.

13. The motion transmitting cable assembly according to claim 10, wherein the lock body has a front section located at one side of the mounting bracket and interlocking with the slider body and a rear section located on the other side of the mounting bracket and forming the plurality of teeth of the lock body.

14. The motion transmitting cable assembly according to claim 13, wherein the interlock between the front section of the lock body and the slider body includes a plurality of tabs of the front section of the lock body extending into a plurality of pockets formed in the slider body.

15. The motion transmitting cable assembly according to claim 10, wherein the lock body has a snap lock located at an end of the lock body opposed to the mounting bracket and that engages the slider body to releasably lock the lock body to the slider body.

16. The motion transmitting cable assembly according to claim 10, wherein the mounting bracket has an aperture spaced from the opening and wherein the slider body has a snap-lock that engages the aperture to releasably lock the slider body to the mounting bracket.

17. The motion transmitting cable assembly according to claim 16, wherein the snap-lock of the slider body is located at a side of the slider body opposite the slot of the mounting bracket.

18. A motion transmitting cable assembly comprising, in combination:

a flexible conduit extending along a central axis;
a flexible core that moves within the conduit along the central axis;
an adjuster body secured to the conduit and having a plurality of teeth;
a slider body that moves along the adjuster body along the central axis;
a lock body having a plurality of teeth that moves relative to the slider body to releasably lock the slider body to the adjuster body;
wherein the teeth of the lock body are engaged with the teeth of the adjuster body when the lock body is in an engaged position to prevent movement of the slider body relative to the adjuster body along the central axis;
a fixed mounting bracket having an opening receiving the slider body therein; and
wherein the lock body extends through the mounting bracket and has a front section located at one side of the mounting bracket and interlocking with the slider body and a rear section located on the other side of the mounting bracket and forming the plurality of teeth of the lock body.

19. The motion transmitting cable assembly according to claim 18, wherein the lock body has opposed lateral slots formed therein and the mounting bracket has a slot extending from the opening to an edge of the mounting bracket with edges of the slot of the mounting bracket located in the slots of the lock body to interlock the lock body and the mounting bracket.

20. The motion transmitting cable assembly according to claim 19, wherein the slots of the lock body are at least partially wedge shaped to ensure engagement with the edges of the slot of the mounting bracket.

21. The motion transmitting cable assembly according to claim 18, wherein the lock body includes an intermediate section located between the front section and the rear section which forms opposed lateral slots.

22. The motion transmitting cable assembly according to claim 18, wherein the interlock between the front section of the lock body and the slider body includes a plurality of tabs of the front section of the lock body extending into a plurality of pockets formed in the slider body.

23. The motion transmitting cable assembly according to claim 18, wherein the rear section of the lock body has a snap lock located at an end of the lock body opposed to the mounting bracket that engages the slider body to releasably lock the lock body to the slider body.

24. The motion transmitting cable assembly according to claim 18, wherein the mounting bracket has an aperture spaced from the opening and wherein the slider body has a snap-lock that engages the aperture to releasably lock the slider body to the mounting bracket.

25. The motion transmitting cable assembly according to claim 24, wherein the snap-lock of the slider body is located at a side of the slider body opposite the front section of the lock body.

26. A motion transmitting cable assembly comprising, in combination:
a flexible conduit extending along a central axis;
a flexible core that moves within the conduit along the central axis;
an adjuster body secured to the conduit and having a plurality of teeth;
a slider body that moves along the adjuster body along the central axis;
a lock body having a plurality of teeth that moves relative to the slider body to releasably lock the slider body to the adjuster body;
wherein the teeth of the lock body are engaged with the teeth of the adjuster body when the lock body is in an engaged position to prevent movement of the slider body relative to the adjuster body along the central axis;
a fixed mounting bracket having an opening receiving the slider body therein; and
wherein the lock body has a snap lock located at an end of the lock body opposed to the mounting bracket that engages the slider body to releasably lock the lock body to the slider body.

27. The motion transmitting cable assembly according to claim 26, wherein the lock body has opposed lateral slots formed therein and the mounting bracket has a slot extending from the opening to an edge of the mounting bracket with edges of the slot of the mounting bracket located in the slots of the lock body to interlock the lock body and the mounting bracket.

28. The motion transmitting cable assembly according to claim 27, wherein the slots of the lock body are at least partially wedge shaped to ensure engagement with the edges of the slot of the mounting bracket.

29. The motion transmitting cable assembly according to claim 26, wherein the lock body includes a front section, a rear section forming the plurality of teeth of the lock body, and an intermediate section located between the front section and the rear section and forming opposed lateral slots.

30. The motion transmitting cable assembly according to claim 26, wherein the lock body has a front section located on one side of the mounting bracket and interlocking with the slider body and a rear section located on the other side of the mounting bracket and forming the plurality of teeth of the lock body.

31. The motion transmitting cable assembly according to claim 30, wherein the interlock between the front section of the lock body and the slider body includes a plurality of tabs of the front section of the lock body extending into a plurality of pockets formed in the slider body.

32. The motion transmitting cable assembly according to claim 26, wherein the mounting bracket has an aperture spaced from the opening and wherein the slider body has a snap-lock that engages the aperture to releasably lock the slider body to the mounting bracket.

33. A motion transmitting cable assembly comprising, in combination:
a flexible conduit extending along a central axis;
a flexible core that moves within the conduit along the central axis;
an adjuster body secured to the conduit and having a plurality of teeth;
a slider body that moves along the adjuster body along the central axis;
a lock body having a plurality of teeth that moves relative to the slider body to releasably lock the slider body to the adjuster body;
wherein the teeth of the lock body are engaged with the teeth of the adjuster body when the lock body is in an engaged position to prevent movement of the slider body relative to the adjuster body along the central axis;
a fixed mounting bracket having an opening receiving the slider body therein; and
wherein the mounting bracket has an aperture spaced from the opening and the slider body has a snap-lock that engages the aperture to releasably lock the slider body to the mounting bracket.

34. The motion transmitting cable assembly according to claim 33, wherein the lock body has opposed lateral slots formed therein and the mounting bracket has a slot extending from the opening to an edge of the mounting bracket with edges of the slot of the mounting bracket located in the slots of the lock body to interlock the lock body and the mounting bracket.

35. The motion transmitting cable assembly according to claim 34, wherein the slots of the lock body are at least partially wedge shaped to ensure engagement with the edges of the slot of the mounting bracket.

36. The motion transmitting cable assembly according to claim 34, wherein aperture is located at a side of the mounting bracket opposite the slot of the mounting bracket.

37. The motion transmitting cable assembly according to claim 33, wherein the lock body includes a front section, a rear section forming the plurality of teeth of the lock body, and an intermediate section located between the front section and the rear section and forming opposed lateral slots.

38. The motion transmitting cable assembly according to claim 33, wherein the lock body has a front section located at one side of the mounting bracket and interlocking with the slider body and a front section located on the other side of the mounting bracket and forming the plurality of teeth of the lock body.

39. The motion transmitting cable assembly according to claim 38, wherein the interlock between the front section of the lock body and the slider body includes a plurality of tabs of the front section of the lock body extending into a plurality of pockets formed in the slider body.

40. The motion transmitting cable assembly according to claim 33, wherein the lock body has a snap lock located at an end of the lock body opposed to the mounting bracket that engages the slider body to releasably lock the lock body to the slider body.

41. A motion transmitting cable assembly comprising, in combination:
a flexible conduit extending along a central axis;
a flexible core that moves within the conduit along the central axis;
an adjuster body secured to the conduit and having a plurality of teeth;
a slider body that moves along the adjuster body along the central axis;
a lock body having a plurality of teeth that moves relative to the slider body to releasably lock the slider body to the adjuster body;
wherein the teeth of the lock body are engaged with the teeth of the adjuster body when the lock body is in an engaged position to prevent movement of the slider body relative to the adjuster body along the central axis;

wherein the lock body has opposed lateral slots formed therein;

a fixed mounting bracket having an opening receiving the slider body therein and a slot extending from the opening to an edge of the mounting bracket with edges of the slot of the mounting bracket located in the slots of the lock body to interlock the lock body and the mounting bracket;

wherein the lock body has a front section located at one side of the mounting bracket and interlocking with the slider body and a rear section located on the other side of the mounting bracket and forming the plurality of teeth of the lock body;

wherein the opposed lateral slots are located between the front section and the rear section;

wherein the interlock between the front section of the lock body and the slider body includes a plurality of tabs of the front section of the lock body extending into a plurality of pockets formed in the slider body; and wherein the lock body has a snap lock located at an end of the lock body opposed to the mounting bracket that engages the slider body to releasably lock the lock body to the slider body.

42. The motion transmitting cable assembly according to claim 41, wherein the mounting bracket has an aperture spaced from the opening opposite the slot of the mounting bracket and the slider body has a snap-lock that engages the aperture to releasably lock the slider body to the mounting bracket.

* * * * *